(12) United States Patent
Hariharan et al.

(10) Patent No.: US 10,660,037 B2
(45) Date of Patent: May 19, 2020

(54) BLUETOOTH(™) LOW-ENERGY SCANNING AND RANGING

(71) Applicant: Apple Inc., Cupertino, CA (US)

(72) Inventors: Sriram Hariharan, San Jose, CA (US); Venkatesh Rajendran, San Jose, CA (US); Alon Paycher, Beit-Hananya (IL); Michael Jason Giles, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/943,602

(22) Filed: Apr. 2, 2018

(65) Prior Publication Data

US 2018/0338286 A1    Nov. 22, 2018

Related U.S. Application Data

(63) Continuation of application No. 15/599,760, filed on May 19, 2017, now Pat. No. 9,942,849.

(51) Int. Cl.
*H04W 52/02*    (2009.01)
*H04W 8/00*     (2009.01)
(Continued)

(52) U.S. Cl.
CPC ....... *H04W 52/0229* (2013.01); *H04W 4/023* (2013.01); *H04W 4/80* (2018.02);
(Continued)

(58) Field of Classification Search
CPC ................................................ H04W 52/0229
See application file for complete search history.

(56) References Cited

U.S. PATENT DOCUMENTS

| 8,965,398 B2 | 2/2015 | Zhu et al. |
| 9,020,433 B2 | 4/2015 | Linde |

(Continued)

FOREIGN PATENT DOCUMENTS

| CN | 106030560 A | 10/2016 |
| WO | WO 2016/036139 A2 | 3/2016 |

OTHER PUBLICATIONS

Extended European Search Report, European Patent Application No. 18172525.0, dated Sep. 17, 2018, 11 pages.
(Continued)

*Primary Examiner* — Hsinchun Liao
(74) *Attorney, Agent, or Firm* — Kowert Hood Munyon Rankin and Goetzel PC; Jeffrey C. Hood

(57) ABSTRACT

A first device may communicate via a first wireless interface (WI) and a second WI, with the second WI operating at a relatively higher power level than the first WI. The first device may receive a scan notification corresponding to wireless scanning performed by a second device. The first device may subsequently perform wireless scanning using the second WI in response to the scan notification indicating that the first device is within effective communication range of a third device. The first device may receive the scan notification over a wireless connection established between the first device and the second device using the first WI. The first device may transmit filter information to the second device, the filter information indicating when, and for which scans the first device is to receive scan notifications. The first device may also activate the second WI and use the second WI to perform ranging and/or control operations associated with the third device.

20 Claims, 7 Drawing Sheets

(51) Int. Cl.
*H04W 4/02* (2018.01)
*H04W 4/80* (2018.01)
*H04W 88/06* (2009.01)

(52) U.S. Cl.
CPC ............ *H04W 8/005* (2013.01); *H04W 88/06* (2013.01); *Y02D 70/00* (2018.01); *Y02D 70/10* (2018.01); *Y02D 70/1242* (2018.01); *Y02D 70/1262* (2018.01); *Y02D 70/1264* (2018.01); *Y02D 70/14* (2018.01); *Y02D 70/142* (2018.01); *Y02D 70/144* (2018.01); *Y02D 70/168* (2018.01); *Y02D 70/20* (2018.01); *Y02D 70/26* (2018.01)

(56) References Cited

U.S. PATENT DOCUMENTS

| | | |
|---|---|---|
| 9,380,119 B2 | 6/2016 | Kasslin et al. |
| 9,491,691 B2 | 11/2016 | Tailor et al. |
| 2013/0005246 A1 | 1/2013 | Waters et al. |
| 2013/0250931 A1 | 9/2013 | Abraham et al. |
| 2014/0097752 A1 | 4/2014 | Biloui |
| 2015/0235052 A1* | 8/2015 | Yoon ................... G06F 21/6263 726/26 |
| 2015/0351010 A1* | 12/2015 | Kumar .................. H04W 48/16 455/434 |
| 2017/0026791 A1 | 1/2017 | Weizman et al. |

OTHER PUBLICATIONS

Office Action, Chinese Patent Application No. 201810476718.6, dated Apr. 30, 2019, seven pages.

* cited by examiner

BLUETOOTH(™) LOW-ENERGY SCANNING AND RANGING

PRIORITY CLAIM INFORMATION

This application is a continuation of U.S. patent application Ser. No. 15/599,760, filed May 19, 2017, titled "BLUETOOTH™ Low-Energy Scanning and Ranging", now U.S. Pat. No. 9,942,849, which is hereby incorporated by reference in its entireties as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to electronic devices, including wireless communication devices having a lower power reserve/source offloading wireless scanning to wireless communication devices having a larger power source/reserve.

DESCRIPTION OF THE RELATED ART

In recent years electronic devices have become increasingly sophisticated. Electronic devices, including smart phones, smart watches, smart glasses, tablet computers, and notebook computers, are often capable of communicating with each other. Such electronic devices may support one or more of various communications technologies, including wired and wireless technologies, in order to connect, communicate or pair with each other. In particular, these devices often utilize short range wireless communication technologies and standards, such as IEEE 802.11 (WLAN or Wi-Fi), or BLUETOOTH™ (BT) or BLUETOOTH™ Low Energy (BLE), among others to connect and/or communicate with each other. In addition, some or all such electronic devices may also be capable of communicating over wireless cellular networks and/or via various other wireless communication means, some examples of which include, GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), etc., just to name a few.

Short range wireless communication technologies are oftentimes used to establish wireless personal area networks (WPANs). WPANs can be used for communication among the electronic devices themselves (intrapersonal communication), or for connecting to a higher level network and the Internet (an uplink), or for connecting accessory devices with the electronic devices (pairing). Other short range wireless communication technologies used in establishing WPANs include Wireless USB™, INSTEON™, IrDA™, and the like. The reach of a WPAN can vary from a few centimeters to a few meters. One primary concept of WPANs is referred to as "plugging in". For example, when any two WPAN-equipped devices come into proximity with each other (within effective communication range of each other), they can establish wireless communications with each other. In general, in this context, "proximity" is used to denote effective communication range. For example, two devices coming into proximity with each other, or into proximity to each other, signifies that the two devices have come within effective communication range with respect to each other. Another feature associated with WPAN-enabled devices and/or accessories is the ability of each device/accessory to selectively lock out other devices/accessories, preventing needless interference or unauthorized access to information. BLE (mentioned above) is a wireless personal area network technology aimed at novel applications in the healthcare, fitness, beacons, security, and home entertainment industries. Compared to classic BLUETOOTH™, BLE is intended to provide considerably reduced power consumption and cost while maintaining a similar communication range. While BLE is not backward-compatible with the classic BLUETOOTH™ protocol, devices may implement either or both of the BLE and classic BLUETOOTH™ systems. BLE uses the same 2.4 GHz radio frequencies as classic BLUETOOTH™, which allows dual-mode devices to share a single radio antenna.

When operating wireless communication devices, keeping an interface active for extended periods of time can be taxing on device power, particularly for a relatively small device, e.g., a wearable device such as a smart watch or smart glasses. That is, activities such as wireless scanning might lead to a faster depletion of the power source or battery of the device, reducing the single-charge use-time of the device. Other corresponding issues related to the prior art will become apparent to one skilled in the art after comparing such prior art with the disclosed embodiments as described herein.

SUMMARY OF THE INVENTION

Embodiments are presented herein of, inter alia, improved systems and methods for relatively small electronic wireless communication devices, e.g. wireless communication devices having smaller power reserves, offloading wireless scanning functionality to proxy device(s) with which the smaller wireless communication devices have established a communication link and which have relatively larger power reserves. Scanning functionality may be offloaded for a variety of reasons, one of which may be to preserve power or to reduce power consumption. However, scanning functionality may be offloaded for other reasons, for example to allocate internal resources of the device to other functions and the like, and scanning functionality may not necessarily be offloaded for the same reason in each instance. Furthermore, as used herein, "power reserve" may refer to a total power storage capacity (e.g. the total capacity of a battery), an amount of remaining power/charge in a battery, a capacity for a device to keep operating without requiring additional power, or any similar power characteristic associated with the device.

In some scenarios, a user may desire to utilize a smaller wireless communication device (e.g. a wearable device such as a smart watch), which may have limited power reserves. However, keeping a wireless interface active for extended periods of time may result in the battery or power source of the device being depleted faster than anticipated or desired, making it difficult to use the device for extended periods of time without having to recharge the battery/power source, or without having to replace the battery (in devices featuring replaceable batteries/power sources). Accordingly, activities such as wireless scanning may be offloaded by the smaller wireless communication device to a proxy device having a larger power reserve, e.g., a larger device like a phone, tablet, portable computer, or another small device with greater charge, just to name a few examples. For example, BLUETOOTH™ and/or Wi-Fi scanning may be offloaded from a device with a smaller power reserve/source to a co-located device that has a greater power reserve. For example, a (smart) watch may offload BLUETOOTH™ and/or Wi-Fi scanning to a cellular/mobile phone. Results of the scanning operation may be exchanged as needed or periodically, e.g., over a low power connection between the devices, an example of which is BLUETOOTH™ low-energy (BLE). The wireless communication device with the smaller power reserve (e.g., watch) may then use notifications—received from the device to which the scanning was offloaded—of available proximate devices, networks, etc., which the wireless communication device may then scan for, detect, and connect with. As a result, the scans conducted by the wireless communication device with the larger power reserve may be leveraged to assist the device with the smaller power reserve. For example, instead of scanning at periodic intervals, the smaller (or smaller power reserve) devices may in this manner be enabled to scan when notified that there are devices, networks, etc. in the proximity, conserving energy and scanning for those devices, networks, etc. that are already known to be in the proximity.

In some instances, the electronic wireless communication device that offloads the scanning may also provide information (e.g., filters) regarding what type of information it would like to receive, e.g. from the proxy device to which the smaller device has offloaded the scanning. For example, the smaller device may select to be notified of certain types of networks, devices, and/or beacons. Furthermore, the offloading device may also specify when it would like to be notified. For example, the smaller device may specify for which types of information it would like to be awakened and/or for which types of information it would like to be notified during communications, e.g. during periodic communications.

In some embodiments, the offloading of wireless scanning may be used for ranging and control operations. For example, ranging technology such as Ultra-Wideband (UWB)—which is a radio technology for transmitting information spread over a large bandwidth—may be prone to high power consumption and may therefore not lend itself to constant use in small(er) wireless communication devices, e.g. for use in a wearable device like a smart watch. Instead, in some embodiments, BLE proximity may be used as a trigger for initiating ranging over a relatively higher power interface of the small(er) wireless communication device. For example, a lower power-reserve device—such as a wearable device or smart phone—may detect that it is in proximity to another device, such as a computer, a car, a door, etc., based on communications with the other devices over a low-power (or relatively lower power) interface, e.g. communications conducted over a BLE interface (e.g., receiving BLE beacons) over a wireless personal area network (WPAN). Upon determining that it is in the proximity of such a device, the lower power-reserve device may turn on its higher-power ranging radio/interface and use that interface to perform the actual ranging operation (e.g. on a Wi-Fi interface or BLUETOOTH™ interface) for a much shorter period of time than if it performed such ranging operation(s) without first becoming aware of the proximity of the other devices, thereby saving power. Furthermore, the lower power-reserve device may offload the BLE proximity detection itself to a higher power-reserve device, allowing it to achieve additional power savings. Thus, when a lower power-reserve device (e.g. smart watch) and a larger power-reserve device (e.g. a smart phone) are both co-located, the lower power-reserve device may still be used to perform an unlock operation, for example, (through wireless ranging), but it may only activate its (higher-power) ranging interface when notified by the larger power-reserve device that scanning, e.g. BLUETOOTH™ scanning, has identified a proximate device, e.g., a device within effective communication range and of a type that may be unlocked by the lower power-reserve device.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
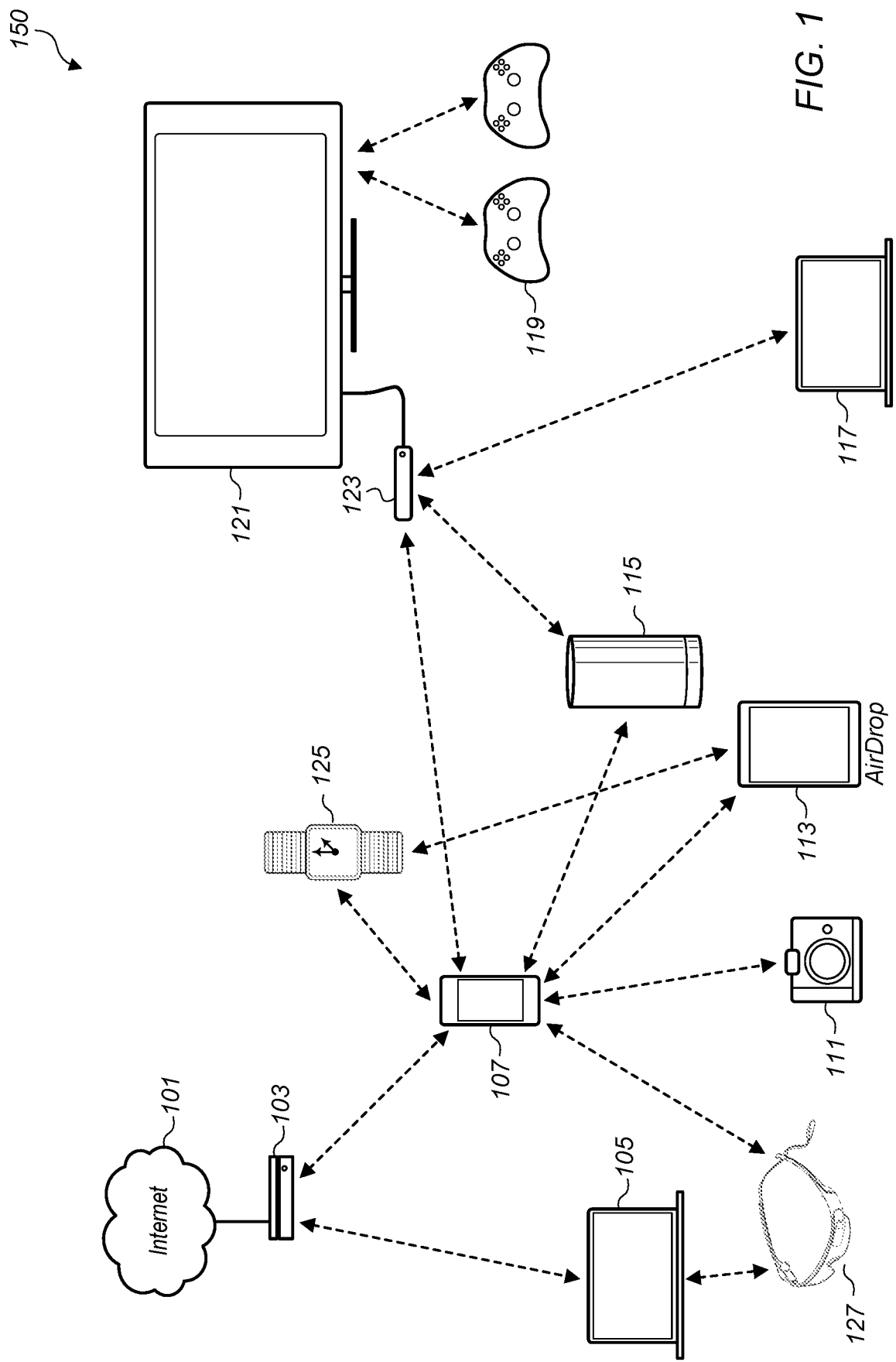
FIG. 1 shows an exemplary communication system in which multiple different devices may communicate with each other over one or more specific frequency bands, using various wireless communication protocols, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
RF: Radio Frequency
AP: Access Point
BT: Bluetooth
BLE: Bluetooth Low Energy
BLEA: Bluetooth Low Energy for Audio
TDD: Time Division Duplexing
TX: Transmission/Transmit
RAT: Radio Access Technology
RX: Reception/Receive
LAN: Local Area Network
WLAN: Wireless LAN, also referred to as Wi-Fi
WPAN: Wireless Personal Area Network
RAT: Radio Access Technology
RSSI: Received Signal Strength Indicator
Wi-Fi: Wireless Local Area Network (WLAN) RAT based on the Institute of Electrical and Electronics Engineers' (IEEE) 802.11 standards Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors and/or processing elements.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Also referred to as wireless communication devices. Examples of UE devices include mobile telephones or smart phones (e.g., iPhone™, Android™-based phones) and tablet computers such as iPad™ Samsung Galaxy™, etc., portable gaming devices (e.g., Nintendo DS™, PlayStation Portable™, Gameboy Advance™, iPod™), laptops, wearable devices (e.g. Apple Watch™, Google Glass™) PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)— any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example. Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—Exemplary Communication System with Multiple Wi-Fi Devices

FIG. 1 shows an exemplary communication system in which multiple different devices may communicate with each other over a specific frequency band or frequency bands, according to multiple radio access technologies (RATs). For example, the device may communicate with each other over 2.4 GHz and/or 5 GHz frequency bands using Wi-Fi, and/or they may communicate with each other via BLUETOOTH™ and/or BLUETOOTH™ low-energy (BLE) among others. 5 GHz Wi-Fi (IEEE 802.11 ac/n) capable devices have become quite common, operating in both peer-to-peer mode and/or station mode, as shown in FIG. 1. Data communications between the devices may include voice, video, real time and best effort type of traffic.

Illustrated devices include cameras (111), tablets (113), media servers/mini-servers (115), portable computers (105, 117), access ports/routers (103), game controllers (119), mobile devices such as smart phones (107), and smart monitors (121) or monitors with wireless access interface (121 together with 123), and may also include wearable devices such as watches 125 (e.g. smart watches) and smart glasses 127. At least some of the devices illustrated in FIG. 1, e.g. watch 125 and glasses 127, may be lower-power reserve devices with respect to other devices, such as tablets 113 and portable computers 105/117, for example. Accordingly, wireless devices such as watch 125 and glasses 127, and in some cases even devices like smart phone 107 may have limited power reserves. When these lower power-reserve devices keep a wireless interface active for extended periods of time, power source or battery of the device may drain faster than anticipated, making use of the devices for extended periods of time more difficult.

Figure 2:
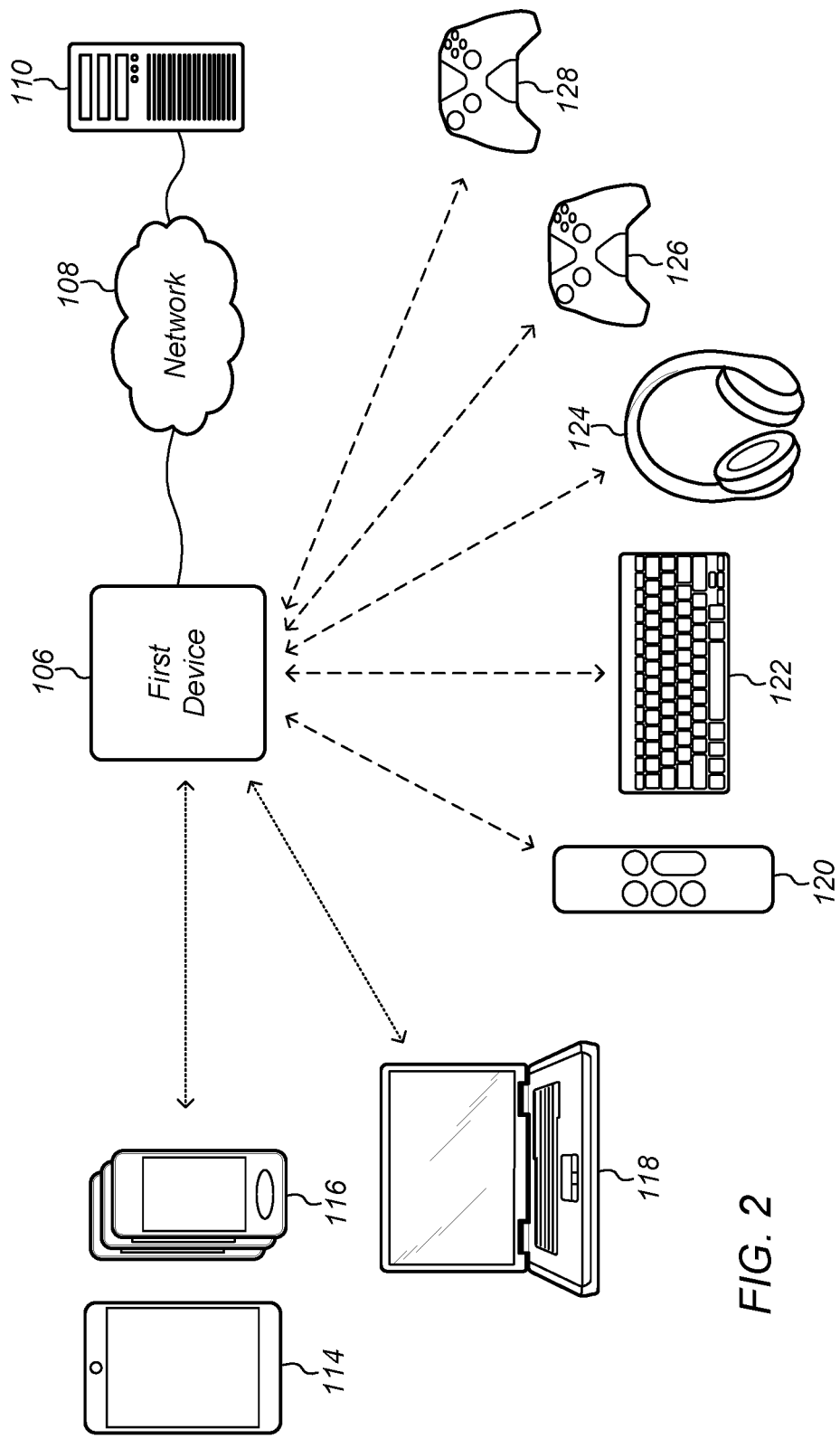
FIG. 2 shows an example wireless communication system in which a first device connects over BLUETOOTH™ and Wi-Fi to various other devices, according to some embodiments.

FIG. 2—Example First Device Connecting to BT Devices

FIG. 2 shows an example first device 106 which may be owned by and/or operated by a first user. The first device 106 may selectively connect over a wireless connection such as BLUETOOTH™ or Wi-Fi or BLE with various devices, such as a tablet computer 114, one or more smart phones 116, a computer 118, a remote control 120, a keyboard 122, a headset or speaker 124, and/or remote game controllers (GC) 126 and 128, etc. In the example shown in FIG. 1, the first device 106 is shown as being possibly connected with a number of BLUETOOTH™ devices, although the first device 106 may connect to any of various types of devices. In this example embodiment, the first device may be any of various types of devices, for example a wearable device such as watch 125 and/or glasses 127 shown in FIG. 1.

The first device 106 is also shown as being connected through a wide area network 108 to a server computer 110. The server computer 110 may store information regarding other devices associated with or owned by the first user, e.g., as indicated by a first user account. For example, the server 110 may be a cloud-based server which stores information regarding other devices owned by the first user. The first device 106 may connect to the server 110 through network 108 over a Wi-Fi network, e.g., through a Wi-Fi access point for an Internet connection. Alternatively, or in addition, the first device 106 may connect to the server 110 through network 108 over a cellular connection. As will be further discussed below, the first device 106 may operate to offload one or more of its wireless scanning function(s) to one or more of the other devices with which first device 106 is wirelessly connected, to thereby reduce power consumption of first device 106. In general, first device 106 may be any of the various wireless devices illustrate in FIG. 1, and may operate to offload the wireless scanning function(s) to any other device determined and/or considered to have a higher power-reserve than first device 106. Alternately, first device 106 may offload it wireless scanning function(s) to any of the other devices for any other reason.

Figure 3:
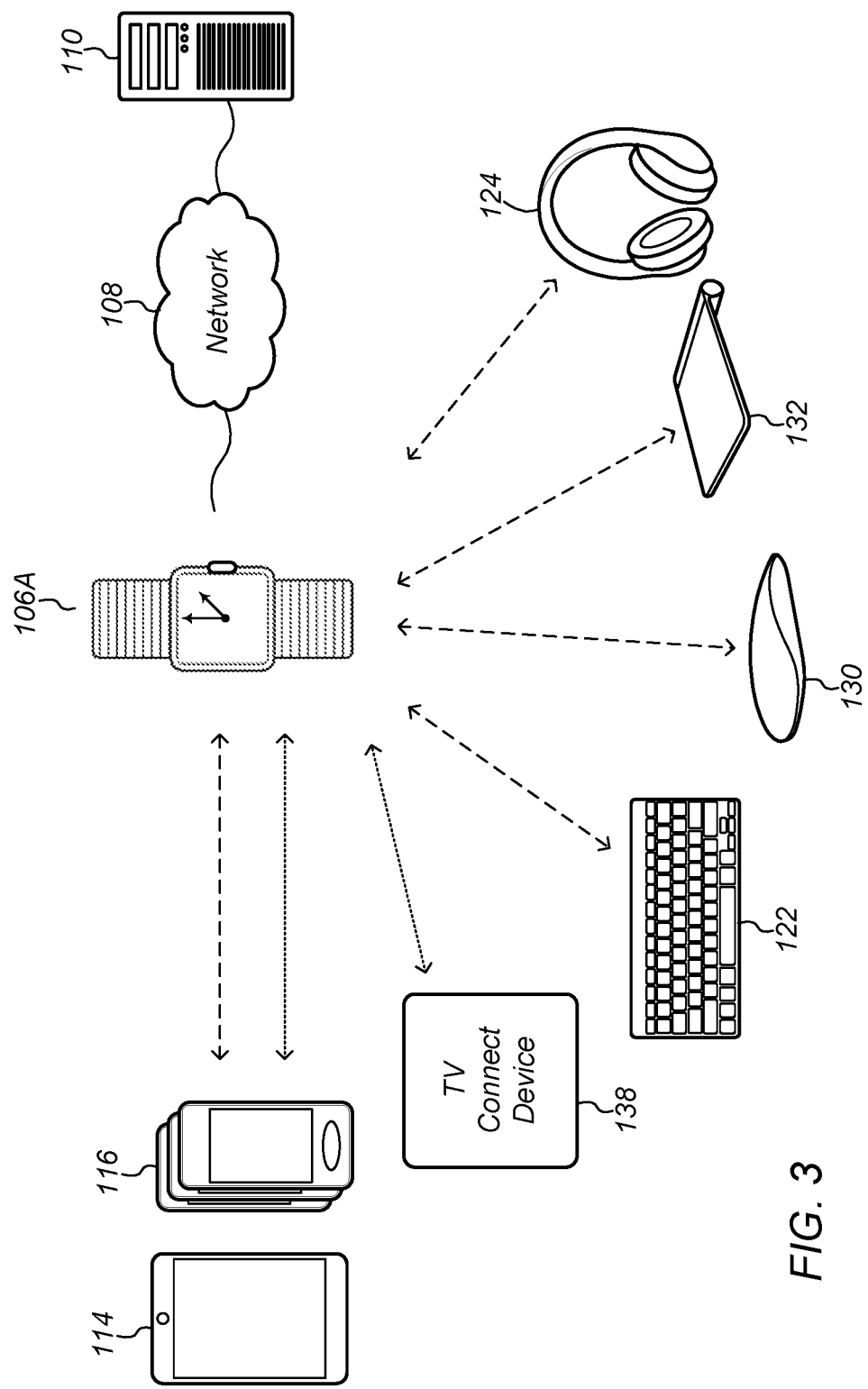
FIG. 3 shows an example wireless communication system in which a first computer system connects over BLUETOOTH™ and Wi-Fi to various other devices, according to some embodiments.

FIG. 3—Example Smart Watch Connecting to BLUETOOTH™ Devices

FIG. 3 illustrates an example where the first device 106 may be a smart watch 106A. Thus FIG. 3 shows an example of a smart watch 106A connected to one or more of various types of wireless devices. In example embodiments, the smart watch 106A may connect to a wireless mouse 130, wireless keyboard 122, wireless trackpad 132, and/or wireless headphones and/or earbuds and/or speaker 124. In addition, the smart watch 106A may establish communications over a wide area network 108, such as the Internet, using any of various communication technologies, such as Wi-Fi and/or cellular, and may also communicate via network 108 to communicate with a remote device/server 110 (for example). Furthermore, smart watch 106A may wirelessly connect to a streaming device 138 (e.g. AppleTV™), and may connect with various mobile devices such as tablets 114 and cellular phones 116. Overall, it should be noted that the first device 106 (such as smart watch 106A) may connect over a WPAN to any one or more of the devices enumerated above, and any other similar devices equipped, for example, with short range wireless communication interfaces, e.g. BLUETOOTH™, BLE, and the like.

Figure 4:
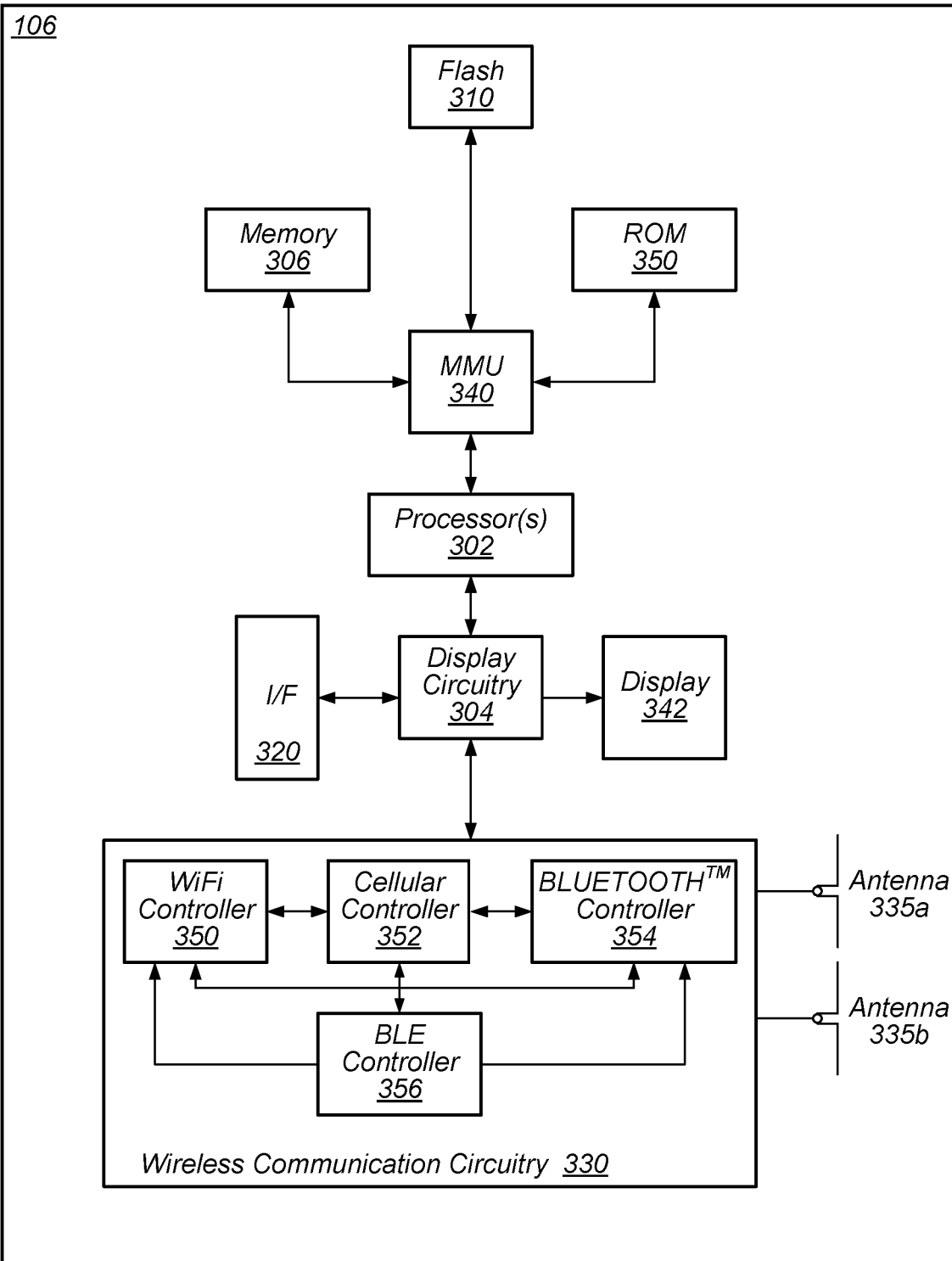
FIG. 4 is a block diagram illustrating an exemplary user device according to some embodiments.

FIG. 4—Example Block Diagram of a Device

FIG. 4 illustrates an exemplary block diagram of a device 106, such as the first device 106 in FIG. 2 and/or smart watch device 106A in FIG. 3. As shown, the device 106 may include processor(s) 302, which may execute program instructions for the device 106 and may comprise display circuitry 304 which may perform graphics processing and provide display signals to the display 342. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310) and/or to other circuits or devices, such as the display circuitry 304, radio 330, connector I/F 320, and/or display 342. The MMU 340 may be configured to perform memory protection and page table translation or set up. In some embodiments, the MMU 340 may be included as a portion of the processor(s) 302.

As shown, the processor(s) 302 may be coupled to various other circuits of the device 106. For example, the device 106 may include various types of memory, a connector interface 320 (e.g., a Universal Serial Bus connector or any suitable wired interface for coupling to another electrical device, e.g. to a computer system), the display 342, and wireless communication circuitry 330 (e.g., for Wi-Fi, BLUETOOTH', BLE, and/or cellular communications such as LTE, LTE-A, GSM, etc.). The device 106 may include at least one antenna (e.g. 335a), and possibly multiple antennas (e.g. illustrated by antennas 335a and 335b), for performing wireless communications with other wireless communication devices. Antennas 335a and 335b are shown by way of example, and UE device 106 may include more antennas. Overall, the one or more antennas are collectively referred to as antenna(s) 335. For example, the device 106 may use antenna(s) 335 to perform the wireless communication with the aid of wireless communication circuitry 330. As noted above, the UE may be configured to communicate wirelessly using multiple wireless communication standards in some embodiments.

As described further subsequently herein, the device 106 may include hardware and software components for implementing methods for offloading wireless scanning performed over higher power wireless interfaces to other wireless communication devices. For example, the device may establish a low-power wireless connection and perform low-power wireless communications with other wireless communication devices, through the course of which the device 106 may offload some or all of its own wireless scanning functions (for wireless scanning over higher power wireless interfaces) to another, preferably higher power reserve device. The device 106 may be configured to implement part or all of the methods described herein, e.g., by executing program instructions stored on a memory medium (e.g., a non-transitory computer-readable memory medium) and/or through hardware or firmware operation. In other embodiments, the methods described herein may be at least partially implemented by a programmable hardware element, such as an FPGA (Field Programmable Gate Array), and/or as an ASIC (Application Specific Integrated Circuit). Thus, the device 106 may be configured to implement methods according to any of various embodiments disclosed herein.

In some embodiments, wireless communication circuitry 330 may include separate controllers dedicated to controlling communications for various respective RAT standards. For example, as shown in FIG. 3, wireless communication circuitry 330 may include a Wi-Fi controller 350, a BLUETOOTH™ controller 354, a BLE controller 356 (in some embodiments the BLUETOOTH™ and BLE controllers may be implemented as a single controller), and may also include a cellular controller (e.g. LTE controller) 352 for communicating over cellular networks. In some embodiments, one or more or all of these controllers may be implemented as hardware, software, firmware, or some combination thereof. While four separate controllers are illustrated within wireless communication circuitry 330, various embodiments may have fewer, more, and/or different controllers for various different RATs that may be implemented in device 106, and some or all of the controllers may be combined into fewer or a single controller.

Figure 5:
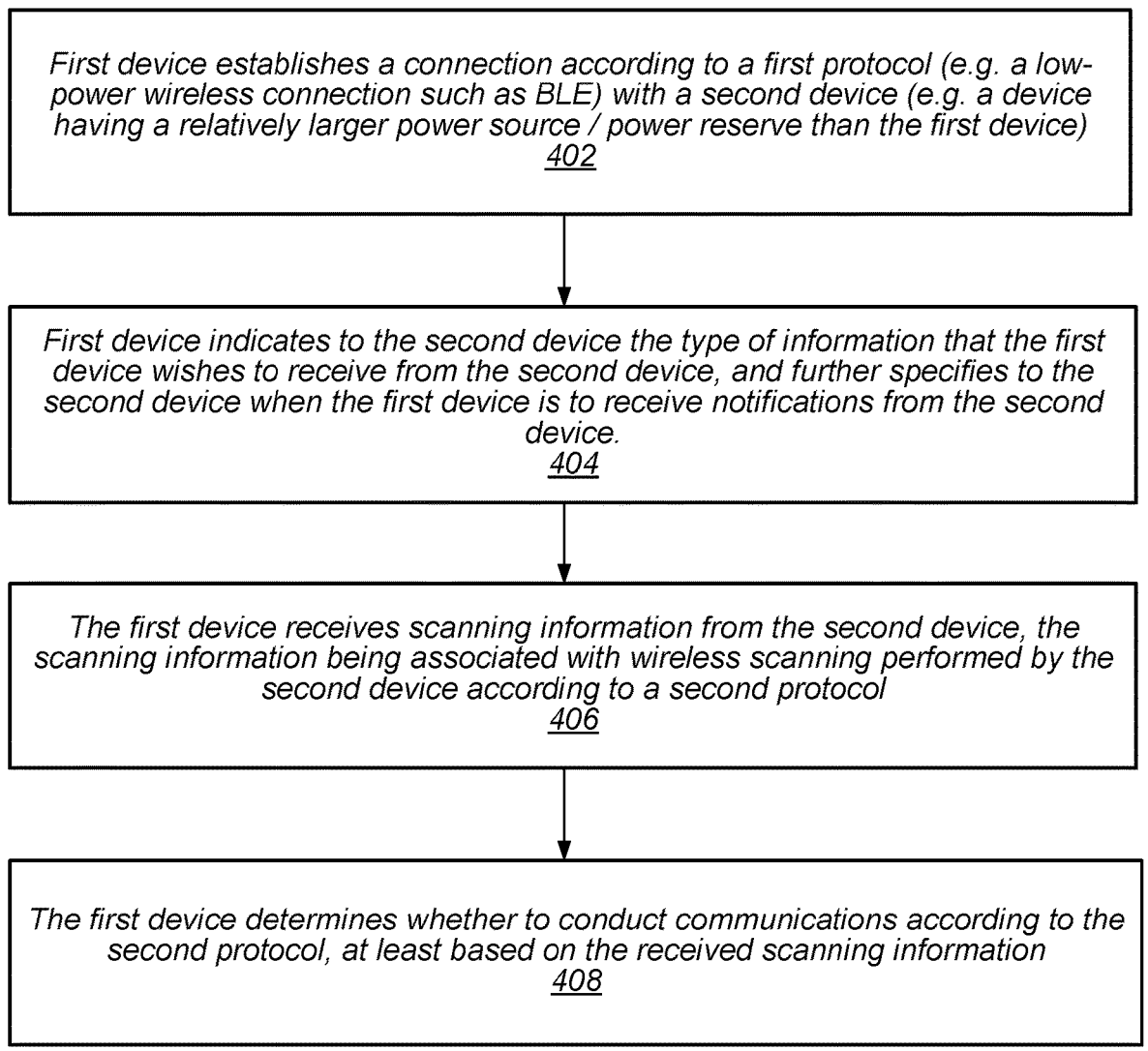
FIG. 5 is a flowchart illustrating an exemplary method for a first device offloading wireless scanning to a second device, according to some embodiments.

FIG. 5—Offloading Wireless Scanning

FIG. 5 shows the flow chart of an exemplary method for a wireless communication device, e.g. a wireless communication device having low power reserves, offloading power consuming wireless scanning operations to another wireless communication device having a larger power supply and/or relatively larger power reserves compared with the wireless communication device offloading the scanning operations. For example, a (smart) watch may offload BLUETOOTH™ and/or Wi-Fi scanning to any or all of a cellular/mobile phone, a tablet, a laptop computer, etc. Results of the scanning operation may be exchanged as needed or periodically, e.g., over a low power connection between the devices, an example of which is BLUETOOTH™ low-energy (BLE). The smart watch may use notifications—received from the larger power reserve device—of available proximate devices, networks, etc. to scan for, detect, and connect with the proximate devices, and the scans conducted by the wireless communication devices with the larger power reserve(s) may be leveraged to assist the device or devices with the smaller power reserve(s).

Accordingly, a first device may establish a connection according to a first protocol, e.g. a low-power wireless connection such as BLE, with at least a second device, e.g. a device having a larger power source/power reserve than the first device (402). In some embodiments, the first device might establish the connection by using notifications sent by the second device to detect/recognize the second device and connect with the second device according to the first protocol. The first device may indicate to the second device what type or kind of information the first device wishes to receive from the second device, and may also specify to the second device when the first device is to receive notifications from the second device (404). In some embodiments, the first device might provide filters to the second device, which the second device may use to filter out the information that it sends to the first device. For example, the first device may select to be notified of certain types of networks, devices, and/or beacons. Furthermore, the first device may specify for which types of information it is to be awakened and/or for which types of information it is to be notified during periodic communications with the second device.

The first device may receive scanning information from the second device, where the scanning information is associated with wireless scanning performed by the second device according to at least a second protocol, possibly more than one protocol (406). For example, the second device may perform wireless scanning for Wi-Fi or BLUETOOTH™ or some other RAT over or according to which the first device may also be capable of communicating. The first device may then determine whether to conduct communications according to the second protocol (or any of the other selected protocols), at least based on the received scanning information (408). For example, the first device may begin conducting Wi-Fi communications based on the scanning information received from the second device. However, because the scanning (for Wi-Fi) was performed by the second device and not the first device, the first device may conserve power and thereby extend its operating time.

Figure 6:
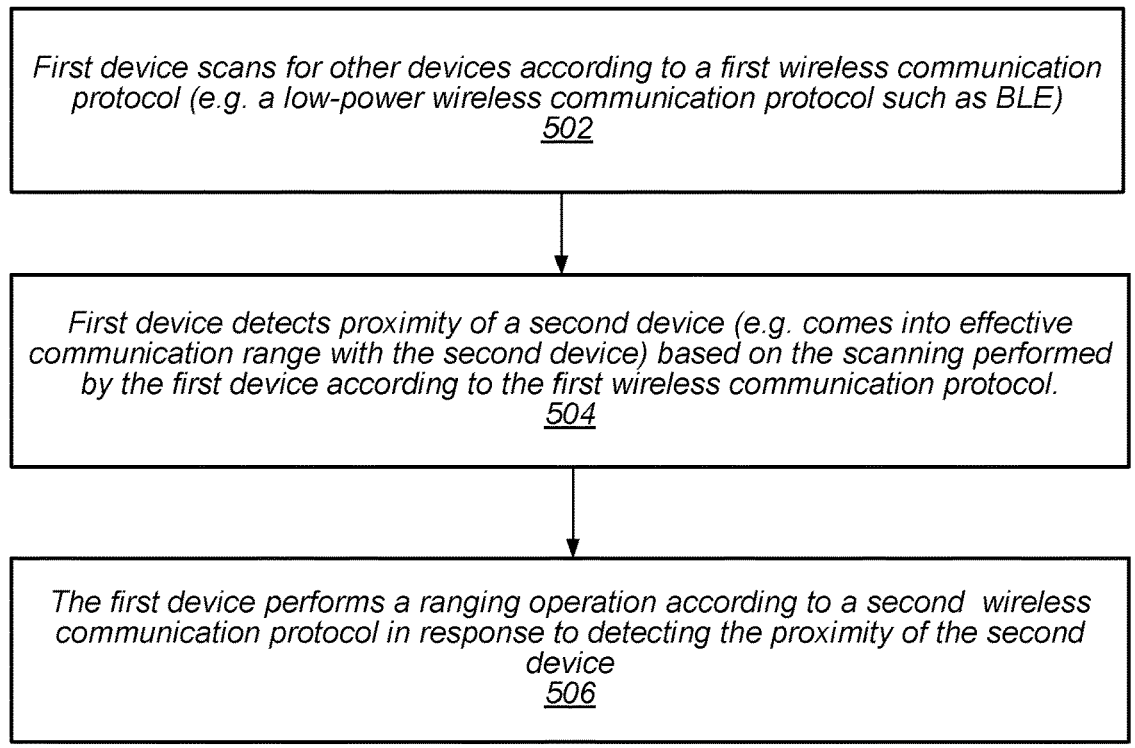
FIG. 6 shows a flow diagram of an exemplary method for performing ranging operations while conserving power, according to some embodiments.

FIG. 6—Ranging Operations Using Proximity Detection

As previously mentioned, in some embodiments, the offloading of wireless scanning operations over higher-power wireless interfaces may be used when performing ranging operations. Some ranging technology—such as Ultra-Wideband (UWB), which is a radio technology for transmitting information spread over a large bandwidth—may consume a large amount of power, making it impractical for frequent or constant use in wireless communication devices having relatively lower power reserves. Therefore, a more efficient implementation of ranging operations may include offloading wireless scanning (performed over higher-power wireless interfaces) to save power. FIG. 6 shows a flow diagram of an exemplary method of performing ranging operations while conserving power, according to a first set of embodiments. As an example, BLE proximity may be used as a trigger for initiating ranging over a higher-power interface. For example, a lower-power reserve device may have multiple different wireless communication interfaces (such as BLUETOOTH™, BLE, Wi-Fi, etc.), and may leverage wireless scanning performed by the device on a lower-power wireless interface (e.g. over BLE) to determine when to perform ranging over one of its higher-power wireless interfaces.

Accordingly, a first device, such as a wearable device or smart phone, may scan for other devices according to a first wireless protocol—e.g. a low-power or reduced power wireless communication protocol, such as BLE (502). In some embodiments, the BLE scanning may result in the first device receiving a BLE beacon signal(s) broadcast by one or more other devices. The one or more other devices may be, e.g., a personal computer, a vehicle, a door, or any of a variety of electronic devices capable of communicating with the first device. The first device may detect that it is in proximity to a second device, based on the low-power scanning performed by the first device according to the first wireless communication protocol, e.g. upon detecting a BLE beacon transmitted by the second device (504). Upon determining that it is in the proximity of the second device, the first device may activate/turn on at least one of its higher-power ranging/radio interfaces to perform a ranging operation according to a second wireless communication protocol (506). By performing the ranging operation (according to the second wireless communication protocol) in response to detecting the proximity of the second device, the first device may perform the ranging operation for a reduced period of time compared to performing the ranging operation without first detecting the proximity of the second device, e.g. using a relatively lower-power wireless communication protocol.

Figure 7:
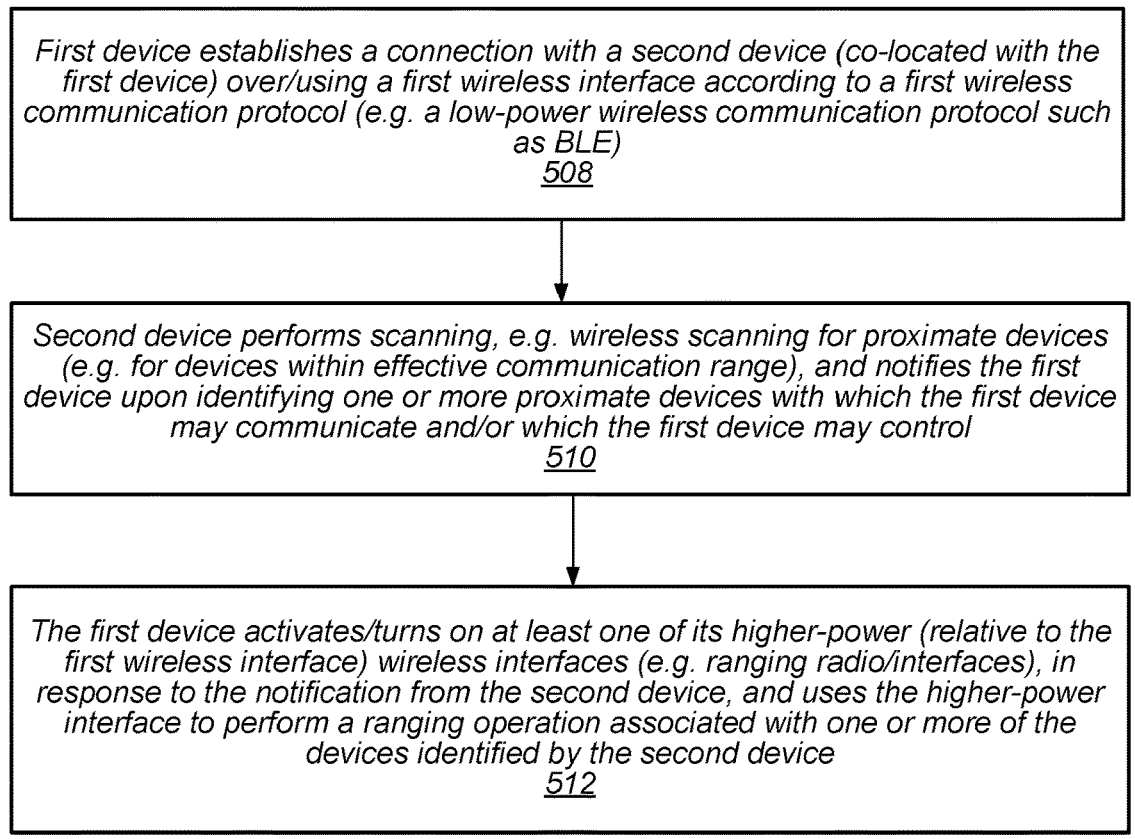
FIG. 7 shows a flow diagram of another exemplary method for performing ranging operations while conserving power, according to some embodiments.

FIG. 7—Ranging Operations Using Offloaded Scanning

FIG. 7 shows a flow diagram of an exemplary method of performing ranging operations while conserving power, according to some embodiments. As shown in FIG. 7, in some embodiments, a first device, such as a wearable device, may offload proximity detection of other devices to a second device (e.g. a higher power-reserve device) with which the first device has already established a connection according to a first wireless communication protocol,—e.g. a low-power or reduced power wireless communication protocol, such as BLE. This may allow the first device to achieve additional power savings when performing ranging operations compared to performing ranging operations according to the exemplary method shown in FIG. 6. For example, when the first device (e.g. smart watch) and the second device (e.g. a smart phone) are both co-located, the first device may still be used to perform an unlock operation (through wireless ranging), but the first device may only activate its higher-power ranging interface (ranging interface operating according to a second wireless communication protocol, e.g. BLUETOOTH™ or Wi-Fi) when notified by the second device that wireless scanning performed by the second device (e.g. according to the first wireless communication protocol or another wireless communication protocol) has identified a proximate device, e.g., a device within effective communication range of the first device and of a type that may be unlocked through a wireless ranging operation, e.g. by the first device.

Accordingly, a first device (e.g. a smart watch) may establish a connection with a second device (e.g. a smart phone co-located with the first device) over a first wireless interface according to a first wireless communication protocol, e.g. a low-power wireless communication protocol such as BLE (508). The second device may perform scanning, e.g. wireless scanning for proximate devices, e.g. for devices within effective communication range, and may notify the first device upon identifying one or more proximate devices with which the first device may communicate and/or which the first device may control (510). The second device may notify the first device using the connection previously established between the first device and the second device according to the first wireless communication protocol. In response to the notification, the first device may activate/turn on a second wireless interface operating at a relatively higher power than the first wireless interface, e.g. consuming more power than the first interface. The second wireless interface may be a higher-power ranging/radio interface, or more generally, wireless interface other than the first wireless interface. The first device may then use the second wireless interface to perform a ranging operation according to a second wireless communication protocol associated with the second wireless interface, and may subsequently perform control on one or more of the proximate devices identified by the second device if the device to be controlled is found to be within effective control range of the first device (512).

Figure 8:
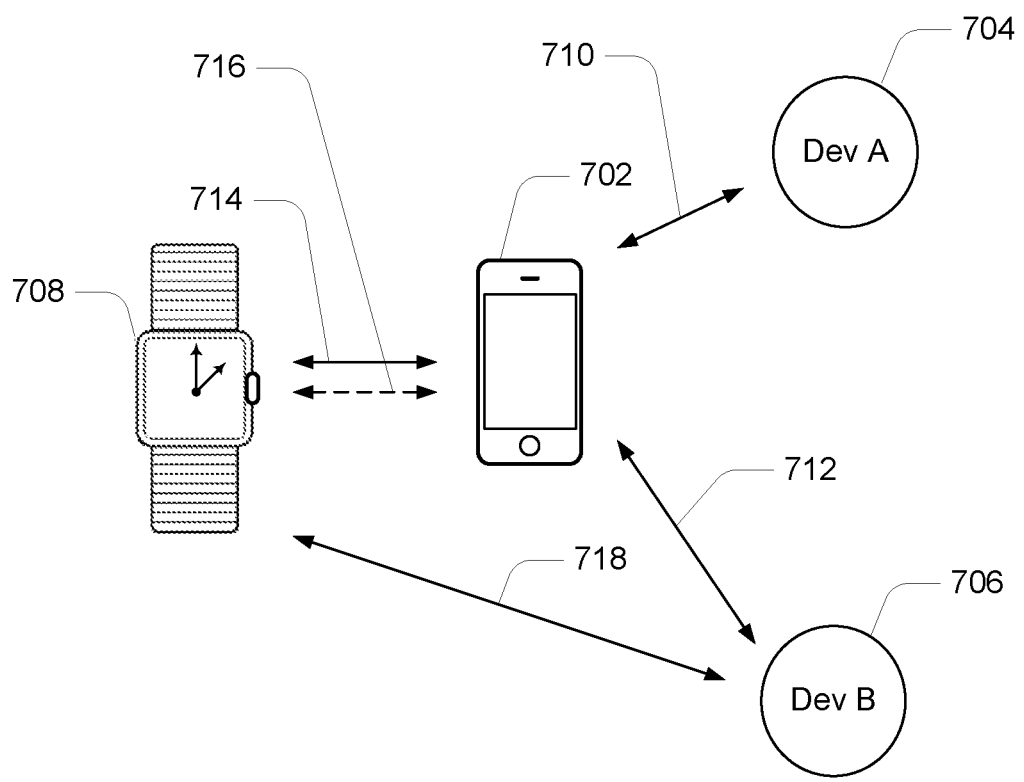
FIG. 8 shows an exemplary wireless communication system in which devices are offloading wireless scanning operations and are performing ranging operations, according to some embodiments.

FIG. 8—Exemplary Operation of Multiple Wireless Communication Devices

FIG. 8 shows an exemplary wireless communication system in which devices are offloading wireless scanning operations and are performing ranging operations, according to some embodiments. More specifically, FIG. 8 provides an illustration of the types of wired and/or wireless connections that may be established in order to allow devices to easily offload wireless scanning operations to other devices, for example to other devices having larger power reserves than the devices offloading the scanning operation(s). FIG. 8 further provides an illustration of the types of wired and/or wireless connections that may be established in order to allow devices to perform ranging operations while conserving power.

A first device 708, e.g. a wearable device (exemplified in FIG. 8 by a smart watch), and a second device 702, e.g. small portable device (exemplified in FIG. 8 by a smart phone) may be linked by a connection, which may be wired (716) or wireless (714). Typically, a wearable device may be connected to a portable device via a wireless connection (714), which wouldn't preclude the possibility of connecting devices 708 and 702 via a wired connection (716). The wireless connection 714 may have been established according to a first wireless communication protocol, e.g. it may be a low-power wireless connection established according to BLUETOOTH™ Low Energy (BLE). Wireless connection 714 may have been established upon device 708 and device 702 coming into proximity of each other. Devices 702 and 708 may remain co-located or in proximity to each other, maintaining the established wireless connection 714.

In some embodiments, device 702 may perform wireless scanning according to a second wireless communication protocol different from the first wireless communication protocol used to establish and maintain wireless connection 714. The wireless scanning performed by device 702 may result in device 702 identifying devices 704 and 706—via wireless links 710 and 712, respectively—as being in the proximity of device 702, and therefore also in the proximity of device 708. Device 702 may notify device 708 via wireless connection 714 of the proximity of devices 704 and 706. In response to receiving such a notification, device 708 may perform wireless scanning according to the second wireless communication protocol or another wireless communication protocol different from the first wireless communication protocol to detect device 704 and/or device 706, and establish a wireless connection with device 704 and/or device 706. For example, device 708 may operate to establish a wireless connection 718 with device 706. In some embodiments, device 708 may provide filter information to device 702 over wireless connection 714 regarding what type of information device 708 may wish to receive from device 702, for example indicating what notifications device 708 is interested in receiving. For example, device 708 may select to be notified of certain types of devices, networks, beacon signals, etc. and/or selecting certain other types of devices, networks, beacon signals, etc. of which device 708 does not wish to be notified. In addition, device 708 may also specify to device 702 when device 708 wishes to be notified. In general, the notifications by device 702 may be provided to device 708 as needed, or they may be provided to device 708 periodically. For example, device 708 may specify for which types of information it would like to be awakened (notification provided as needed) and/or for which types of information it would like to be notified during periodic communications (notifications provided periodically).

In some embodiments, results of wireless scanning operations performed by any of devices 702, 708, 704 and/or 706 may be exchanged between the devices, to allow each device to leverage the scans already obtained by any of the other devices to save power and/or time by not performing unnecessary scanning operations. For example, results of wireless scans performed by device 702 may be shared with devices 708, 704 and 706, which may perform further wireless scanning operations according to the results of the scanning operations shared by device 702. Furthermore, each device may provide is own set of filter information to one or more of the other devices to indicate what type of information/notification the device wishes to receive from the other device(s) and when the device wishes to receive the information/notification.

In some embodiments, device 708 may perform ranging operations based on proximity detection of any of the other devices. For example, device 708 may perform wireless scanning according to a first wireless communication protocol (which may be a low-power wireless communication protocol, e.g. BLE) to detect the proximity of any one or more of devices 702, 704, and/or 706. In case one or more of the devices is of a specific type, e.g. device 704 may be a car and device 706 may be a personal computer, device 708 may activate a ranging radio/interface (operating according to a second wireless communication protocol different from the first wireless communication protocol and possibly having a higher power-consumption than the first wireless communication protocol) to perform a ranging operation. This allows device 708 to perform the actual ranging operation for a shorter time duration than if device 708 performed the ranging operation without first detecting devices 704 and/or 706 via the first wireless communication protocol. Alternately, if device 708 and 702 are co-located and have an already established connection, e.g. wireless connection 714 described above, device 708 may not perform additional wireless scanning according to the first wireless communication protocol to detect the proximity of devices 704 and 706, but may instead leverage being notified by device 702 of the proximity of devices 704 and 706 (as described above with respect to device 708 offloading wireless scanning to device 702), to perform the ranging operation(s).

Embodiments of the present disclosure may be realized in any of various forms. For example, in some embodiments, the subject matter of the present disclosure may be realized as a computer-implemented method, a computer-readable memory medium, or a computer system. In other embodiments, the present invention may be realized using one or more custom-designed hardware devices such as ASICs. In other embodiments, the subject matter of the present disclosure may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A device comprising:
a first wireless interface configured to facilitate wireless communications according to a first wireless communication protocol;
a second wireless interface configured to facilitate wireless communications according to a second wireless communication protocol, wherein the second first wireless interface operates at a lower power level relative to a power level at which the second wireless interface operates; and
a processing element communicatively coupled to the first wireless interface and to the second wireless interface, and configured to cause the device to:
scan, using the first wireless interface, for one or more other devices;
activate the second wireless interface in response to the scan indicating that a second device is within effective communication range of the device; and
perform, using the second wireless interface, a ranging operation associated with the second device.

2. The device of claim 1, wherein the processing element is configured to further cause the device to use the first wireless interface to establish a wireless connection with the second device.

3. The device of claim 2, wherein the processing element is configured to further cause the device to establish the wireless connection with the second device in response to the device coming within effective communication range of the second device.

4. The device of claim 2, wherein the processing element is configured to further cause the device to:
use the first wireless interface to transmit, to the second device, one or more of:
an indication of a type of information the device is to receive from the second device; or
and indication of a time at which the device is to receive a notification from the second device.

5. The device of claim 1, wherein the processing element is configured to further cause the device to receive scanning information from the second device, wherein the scanning information is associated with wireless scanning for one or more other devices performed by the second device.

6. The device of claim 5, wherein the wireless scanning by the second device is performed according to a wireless communication protocol different from the first wireless communication protocol.

7. The device of claim 5, wherein the processing element is configured to further cause the device to determine whether to conduct communications using the second wireless interface at least based on the scanning information.

8. An apparatus comprising:
a processing element configured to cause a first device to:
scan, using a first wireless interface, for one or more other devices;
activate a second wireless interface in response to the scan indicating that a
second device is within effective communication range of the first device, wherein the second
first wireless interface operates at a lower power level relative to a power level at which the second wireless interface operates; and
perform, using the second wireless interface, a ranging operation associated with the second device.

9. The apparatus of claim 8, wherein the processing element is configured to further cause the first device to:
use the first wireless interface to establish a wireless connection with the second device in response to the first device being within effective communication range of the second device.

10. The apparatus of claim 9, wherein the processing element is configured to further cause the first device to:
use the first wireless interface to transmit, to the second device, one or more of:
an indication of a type of information the first device is to receive from the second device; or
an indication of a time at which the first device is to receive a notification from the second device.

11. The apparatus of claim 8, wherein the processing element is configured to further cause the first device to receive scanning information from the second device, wherein the scanning information is associated with wireless scanning for one or more other devices performed by the second device.

12. The apparatus of claim 11, wherein the wireless scanning by the second device is performed according to a wireless communication protocol different from the first wireless communication protocol.

13. The device of claim 11, wherein the processing element is configured to further cause the first device to determine whether to conduct communications using the second wireless interface at least based on the scanning information.

14. A non-transitory memory element storing instructions executable by a processing element to cause a first device to:
scan, using a first wireless interface, for one or more other devices;
activate a second wireless interface in response to the scan indicating that a second
device is within effective communication range of the first device, wherein the second first
wireless interface operates at a lower power level relative to a power level at which the second wireless interface operates; and
perform, using the second wireless interface, a ranging operation associated with the second device.

15. The non-transitory memory element of claim 14, wherein the instructions are executable by the processing element to further cause the first device to:
use the first wireless interface to establish a wireless connection with the second device in response to the first device being within effective communication range of the second device.

16. The non-transitory memory element of claim 15, wherein the instructions are executable by the processing element to further cause the first device to:
use the first wireless interface to transmit, to the second device, one or more of:
an indication of a type of information the first device is to receive from the second device; or
an indication of a time at which the first device is to receive a notification from the second device.

17. The non-transitory memory element of claim 14, wherein the instructions are executable by the processing element to further cause the first device to receive scanning information from the second device, wherein the scanning information is associated with wireless scanning for one or more other devices performed by the second device.

18. The non-transitory memory element of claim 17, wherein the wireless scanning by the second device is performed according to a wireless communication protocol different from the first wireless communication protocol.

19. The non-transitory memory element of claim 14, wherein the instructions are executable by the processing element to further cause the first device to determine whether to conduct communications using the second wireless interface at least based on the scanning information.

20. The non-transitory memory element of claim 14, wherein the first wireless interface comprises a BLUETOOTH™ Low Energy interface and the second wireless interface comprises one of a BLUETOOTH™ interface or a Wi-Fi interface.

* * * * *